United States Patent
Yasuda et al.

(10) Patent No.: US 8,084,562 B2
(45) Date of Patent: Dec. 27, 2011

(54) METHOD FOR PRODUCING POLYMER-DISPERSED POLYOL

(75) Inventors: Teruhiko Yasuda, Kamisu (JP); Hisashi Sato, Kamisu (JP); Hiroshi Wada, Kamisu (JP); Yasuhito Adachi, Kamisu (JP); Tomohiro Hayashi, Kamisu (JP); Chitoshi Suzuki, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 392 days.

(21) Appl. No.: 12/469,296

(22) Filed: May 20, 2009

(65) Prior Publication Data

US 2009/0227696 A1  Sep. 10, 2009

Related U.S. Application Data

(63) Continuation of application No. PCT/JP2007/072462, filed on Nov. 20, 2007.

(30) Foreign Application Priority Data

Nov. 20, 2006 (JP) ................. 2006-312811

(51) Int. Cl.
 *C08F 2/44* (2006.01)
 *C08F 20/44* (2006.01)
 *C08F 283/06* (2006.01)
 *C08G 18/63* (2006.01)
 *C08L 75/04* (2006.01)

(52) U.S. Cl. ........ 526/245; 526/209; 524/457; 524/544; 524/765

(58) Field of Classification Search .............. 526/245, 526/209; 524/457, 544, 765
See application file for complete search history.

(56) References Cited

U.S. PATENT DOCUMENTS

| 5,350,795 A | * | 9/1994 | Smith et al. .......... 524/507 |
| 6,602,450 B1 | | 8/2003 | Sato et al. |
| 6,887,913 B2 | | 5/2005 | Hotta et al. |

FOREIGN PATENT DOCUMENTS

| EP | 0 224 945 A1 | | 6/1987 |
| JP | 57-25313 | | 2/1982 |
| JP | 5262833 (A) | | 10/1993 |
| JP | 6192347 (A) | | 7/1994 |
| JP | 8-503720 | | 4/1996 |
| JP | 11106447 A | * | 4/1999 |
| JP | 11106447 (A) | | 4/1999 |
| JP | 11-302340 | | 11/1999 |
| JP | 11302340 A | * | 11/1999 |
| JP | 2004262954 (A) | | 9/2004 |
| JP | 2005272806 A | * | 10/2005 |
| JP | 2005272806 (A) | | 10/2005 |
| WO | WO 2006/126611 (A1) | | 11/2006 |

* cited by examiner

*Primary Examiner* — Kelechi Egwim
(74) *Attorney, Agent, or Firm* — Oblon, Spivak, McClelland, Maier & Neustadt, L.L.P.

(57) ABSTRACT

To provide a method for producing a polymer-dispersed polyol which has high compatibility with a polyol for rigid polyurethane foams and is excellent in storage stability and which provides good heat-insulating performance when it is formed into a rigid polyurethane foam. Also a method for producing a polymer-dispersed polyol for rigid polyurethane foams, having polymer particles dispersed in a polyol, which comprises polymerizing a monomer having a polymerizable unsaturated group in a polyol (X), wherein the polyol (X) contains a polyether polyol (Y) having an oxyethylene group content of at least 10 mass %, and the monomer having a polymerizable unsaturated group contains a fluorinated acrylate or a fluorinated methacrylate.

10 Claims, No Drawings

METHOD FOR PRODUCING POLYMER-DISPERSED POLYOL

TECHNICAL FIELD

The present invention relates to a method for producing a polymer-dispersed polyol for rigid polyurethane foams.

BACKGROUND ART

A rigid foamed synthetic resin (such as a rigid polyurethane foam which may be hereinafter referred to also as "a rigid foam") produced by reacting a polyol component with a polyisocyanate component in the presence of a blowing agent, etc., is widely used as a heat-insulating material having closed cells.

As a blowing agent to be used for such a rigid foam, a hydrofluorocarbon compound or a hydrocarbon compound having a low boiling point is mainly used.

With respect to a rigid foam represented by e.g. a boardstock foam, further density reduction of the foam is desired in order to reduce the cost or the weight by reducing the amount of the raw material to be used. However, there is a problem such that along with density reduction of a foam, the strength of the foam tends to decrease, and the rigid foam is likely to undergo shrinkage.

Further, with respect to a blowing agent, in consideration of a load to the environment, it has been studied to reduce a low boiling point hydrofluorocarbon compound and increase water, or in consideration of the flammability, it has been studied to reduce a hydrocarbon compound and increase water, or a technique has been studied to use only water without using a low boiling point hydrofluorocarbon compound or hydrocarbon compound.

However, in a case where density reduction of a foam is attempted by combining water with a hydrofluorocarbon compound or hydrocarbon compound, or density reduction of a foam is attempted by water-foaming by carrying out foaming by means of only water, the foam tends to be remarkably susceptible to shrinkage, thus leading to deterioration in dimensional stability of the foam.

In order to secure the dimensional stability of a foam, it is usually conceivable to increase the density of the foam thereby to increase the strength of the foam, or to make cells of the foam to be open cells.

However, in the method of increasing the density of the foam, the amount of the raw material to be used increases, thus leading to an increase in cost. On the other hand, in the method of making cells of the foam to be open cells, no adequate heat-insulating properties can be obtained, although the dimensional stability of the foam may thereby be improved.

That is, a rigid foam is desired to have good dimensional stability and sufficient heat-insulating properties when water is used as a blowing agent in a large amount or when foaming is carried out solely by water.

Heretofore, a method of using a fluorinated compound such as polytetrafluoroethylene (PTFE) has been proposed as prior art to improve the dimensional stability by preventing shrinkage of a rigid polyurethane foam (Patent Documents 1 and 2). According to the method disclosed in Patent Documents 1 and 2, by addition of PTFE having a small particle size, fine pores may be formed in the foam, whereby the dimensional stability will be improved, and at the same time good heat-insulating properties can be obtained.

Further, a method of incorporating a polymer-dispersed polyol to a polyol component is proposed (Patent Documents 3 and 4).

Here, "the polymer-dispersed polyol" is a polyol having polymer particles dispersed in a polyol such as a polyether polyol or a polyester polyol.

Such a polymer-dispersed polyol has heretofore been used to improve the hardness of a flexible foam or semi-rigid foam.

As a typical example of the method for producing a polymer-dispersed polyol, the following method is known. That is, it is a method of carrying out polymerization of a monomer having a polymerizable unsaturated group in a saturated polyol having no polymerizable unsaturated bond, if required, under such a condition that an unsaturated polyol having a polymerizable unsaturated bond is also present, followed by removing an unreacted component. As such a saturated polyol or unsaturated polyol, various polyether polyols or polyester polyols are known.

Patent Document 1: EP0224945
Patent Document 2: JP-A-8-503720
Patent Document 3: JP-A-57-25313
Patent Document 4: JP-A-11-302340

DISCLOSURE OF THE INVENTION

Problems to be Solved by the Invention

However, a fluorinated compound to be used, for example, in the method disclosed in Patent Documents 1 and 2, is usually poor in its solubility in an organic substance, and it has been found that when a fluorinated compound such as PTFE is stored as added to a polyol compound, the storage stability is poor, as the fluorinated compound and the polyol compound will be separated.

Further, it has been found that the polymer-dispersed polyol to be used in the method disclosed in Patent Document 3 is inadequate in the storage stability when mixed with a polyol for a rigid polyurethane foam having a small molecular weight, and it is difficult to satisfy both the dimensional stability and the heat-insulating properties when formed into a rigid polyurethane foam.

The method disclosed in Patent Document 4 is intended to satisfy both the dimensional stability and the heat-insulating properties, but it still has a problem with respect to the thermal conductivity.

Accordingly, it is an object of the present invention to provide a method for producing a polymer-dispersed polyol which has high compatibility with a polyol for rigid polyurethane foams and is excellent in storage stability and which provides good heat-insulating properties when it is formed into a rigid polyurethane foam.

Here, "the storage stability" in the present invention means a characteristic such that when a mixture of the polymer-dispersed polyol and a polyol for rigid polyurethane foams, is stored, the uniformity of the mixture can be maintained. In a case where the storage stability is poor, it becomes difficult to obtain a rigid polyurethane foam having a stabilized quality, i.e. the polymer particles will be separated from the polyol compound, or in the mixture, the polymer-dispersed polyol will migrate to make the composition non-uniform.

Means to Solve the Problems

The present invention provides a method for producing a polymer-dispersed polyol for rigid polyurethane foams, having polymer particles dispersed in a polyol, which comprises polymerizing a monomer having a polymerizable unsaturated group in a polyol (X), wherein the polyol (X) contains a polyether polyol (Y) having an oxyethylene group content of at least 10 mass %, and the monomer having a polymerizable unsaturated group contains a fluorinated acrylate or a fluorinated methacrylate.

In the method for producing a polymer-dispersed polyol of the present invention, it is preferred that the fluorinated acrylate or the fluorinated methacrylate is a monomer represented by the following formula (1):

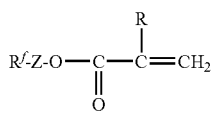

Formula (1)

wherein $R^f$ is a $C_{1-18}$ polyfluoroalkyl group, R is a hydrogen atom or a methyl group, and Z is a bivalent linking group.

Further, in the method for producing a polymer-dispersed polyol of the present invention, it is preferred that the monomer having a polymerizable unsaturated group further contains at least one member selected from the group consisting of acrylonitrile, vinyl acetate and styrene.

Further, in the method for producing a polymer-dispersed polyol of the present invention, it is preferred that the polyether polyol (Y) has an oxyethylene group content of at least 60 mass %.

Further, in the method for producing a polymer-dispersed polyol of the present invention, it is preferred that the polyether polyol (Y) has a hydroxyl value of at most 84 mgKOH/g.

Further, in the method for producing a polymer-dispersed polyol of the present invention, it is preferred that the polyether polyol (Y) is a polyoxyalkylene polyol obtained by addition-polymerizing propylene oxide and ethylene oxide to a polyhydric alcohol.

Further, in the method for producing a polymer-dispersed polyol of the present invention, it is preferred that the proportion of the monomer represented by the formula (1) in the entire monomer having a polymerizable unsaturated group, is from 30 to 100 mass %.

Further, in the method for producing a polymer-dispersed polyol of the present invention, it is preferred that the monomer represented by the formula (1) is one wherein $R^f$ is a $C_{3-8}$ polyfluoroalkyl group, and Z is an alkylene group or an arylene group.

Further, in the method for producing a polymer-dispersed polyol of the present invention, it is preferred that the monomer represented by the formula (1) is any one of monomers represented by the following formulae (1-1) to (1-3):

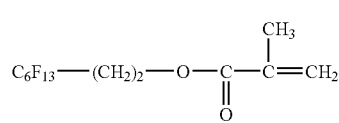

(1-1)

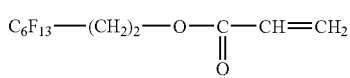

(1-2)

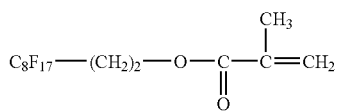

(1-3)

Further, in the method for producing a polymer-dispersed polyol of the present invention, it is preferred that the concentration of the polymer particles is from 1 to 50 mass %.

Effects of the Invention

By the method for producing a polymer-dispersed polyol of the present invention, it is possible to produce a polymer-dispersed polyol which has high compatibility with a polyol for rigid polyurethane foams and is excellent in storage stability and which provides good heat-insulating properties when formed into a rigid polyurethane foam.

BEST MODE FOR CARRYING OUT THE INVENTION

Method for Producing Polymer-Dispersed Polyol

The method for producing a polymer-dispersed polyol of the present invention is a method for producing a polymer-dispersed polyol for rigid polyurethane foams, having polymer particles dispersed in a polyol, which comprises polymerizing a monomer having a polymerizable unsaturated group in a polyol (X), wherein the polyol (X) contains a polyether polyol (Y) having an oxyethylene group content of at least 10 mass %, and the monomer having a polymerizable unsaturated group contains a fluorinated acrylate or a fluorinated methacrylate.

In the present invention, "in a polyol (X)" may be in a polyol (X) alone or in a mixture of a polyol (X) and a solvent exemplified in the following description with respect to "Method for producing polymer-dispersed polyol".

Polyol (X)

As the polyol (X) in the present invention, it is possible to use e.g. a polyether polyol, a polyester polyol or a hydrocarbon polymer having hydroxyl groups at its terminals.

However, in the present invention, the polyol (X) contains at least a polyether polyol (Y) having an oxyethylene group content of at least 10 mass %.

As the polyether polyol, it is possible to use one obtained by addition-polymerizing a cyclic ether such as an alkylene oxide to an initiator such as an amine or a polyhydroxy compound such as a polyhydric alcohol or a polyhydric phenol.

The initiator may specifically be a polyhydric alcohol such as ethylene glycol, diethylene glycol, propylene glycol, dipropylene glycol, neopentyl glycol, 3-methyl-1,5-pentanediol, 1,4-butanediol, 1,6-hexanediol, water, glycerin, trimethylolpropane, 1,2,6-hexanetriol, pentaerythritol, diglycerin, tetramethylolcyclohexane, methyl glucoside, sorbitol, mannitol, dulcitol, sucrose or triethanolamine; a polyhydric phenol such as bisphenol A, or an initial condensate of phenol/formaldehyde; an amino compound such as piperazine, aniline, monoethanolamine, diethanolamine, isopropanolamine, aminoethylethanolamine, ammonia, aminomethylpiperazine, aminoethylpiperazine, ethylenediamine, propylenediamine, hexamethylenediamine, tolylenediamine, xylylenediamine, diphenylmethanediamine, diethylenetriamine or triethylenetetramine, or a cyclic ether addition product thereof.

Such initiators may be used alone or in combination as a mixture of two or more of them.

As the cyclic ether, it is possible to use, for example, a 3- to 6-membered cyclic ether compound having one oxygen atom in the ring.

Such a cyclic ether may specifically be a compound having a 3-membered cyclic ether group (monoepoxide) such as ethylene oxide, propylene oxide, isobutylene oxide, 1-butene oxide, 2-butene oxide, trimethylethylene oxide, tetramethylethylene oxide, butadiene monooxide, styrene oxide, α-methylstyrene oxide, epichlorohydrin, epifluorohydrin, epibromohydrin, glycidol, butyl glycidyl ether, hexyl glycidyl ether, phenyl glycidyl ether, 2-chloroethyl glycidyl ether, o-chlorophenyl glycidyl ether, ethylene glycol diglycidyl ether, bisphenol A diglycidyl ether, cyclohexene oxide, dihydronaphthalene oxide or vinyl cyclohexene monooxide; or a compound having a 4- to 6-membered cyclic ether group, such as oxetane, tetrahydrofuran or tetrahydropyran.

Among them, a compound having a 3-membered cyclic ether group (monoepoxide) is preferred, and a $C_{2-4}$ alkylene oxide is more preferred. Ethylene oxide, propylene oxide, isobutylene oxide, 1-butene oxide or 2-butene oxide is further preferred, and ethylene oxide or propylene oxide is particularly preferred.

Such cyclic ethers may be used alone or in combination as a mixture of two or more of them.

In a case where two or more cyclic ethers are to be used in combination, such cyclic ethers are preferably $C_{2-4}$ alkylene oxides, and a combination of propylene oxide and ethylene oxide is most preferred. In such a case, the mixture of two or more cyclic ethers may be addition-polymerized to the above mentioned initiator, or two or more cyclic ethers may be sequentially addition-polymerized.

In the present invention, the polyol (X) contains at least the polyether polyol (Y) among the above polyether polyols.

As the polyether polyol (Y) is contained, the compatibility with a polyol for rigid polyurethane foams (as described hereinafter) will be increased, whereby a polymer-dispersed polyol excellent in storage stability will be obtained.

The polyether polyol (Y) has an oxyethylene group content of at least 10 mass %, preferably at least 30 mass %, more preferably at least 40 mass %, further preferably at least 55 mass %, particularly preferably at least 60 mass %, in the polyether polyol (Y). Further, the oxyethylene group content is preferably at most 90 mass %.

When the oxyethylene group content is at least 10 mass %, the polymer particles will be stably dispersed, and it will be possible to readily obtain a polymer-dispersed polyol having improved storage stability. Particularly when the oxyethylene group content is at least 60 mass %, it will be possible to readily obtain a polymer-dispersed polyol excellent in storage stability for a longer period (for example a period of one month).

In the present invention, "the oxyethylene group content" is the proportion of oxyethylene groups in the polyol compound.

Further, the polyether polyol (Y) preferably has a hydroxyl value of at most 84 mgKOH/g, more preferably at most 67 mgKOH/g, particularly preferably at most 60 mgKOH/g. The lower limit value for such a hydroxyl value is preferably at least 5 mgKOH/g, more preferably at least 8 mgKOH/g, particularly preferably at least 20 mgKOH/g, most preferably at least 30 mgKOH/g. When the hydroxyl value is at most 84 mgKOH/g, the storage stability can be made good even with a low viscosity, and when it is at least 5 mgKOH/g, the storage stability will be good, such being desirable.

When the hydroxyl value of the polyether polyol (Y) is at most 84 mgKOH/g, the oxyethylene group content in the polyether polyol (Y) becomes substantially equal to the oxyethylene group content based on the total of oxyalkylene groups in the polyether polyol (Y).

Further, the polyether polyol (Y) is preferably one obtained by using a polyhydric alcohol as an initiator and addition-polymerizing ethylene oxide, or ethylene oxide and another cyclic ether therewith.

As the polyhydric alcohol, for example, glycerin, trimethylolpropane or 1,2,6-hexanetriol is preferred.

As another cyclic ether, for example, propylene oxide, isobutylene oxide, 1-butene oxide or 2-butene oxide is preferred, and propylene oxide is particularly preferred.

Especially, the polyether polyol (Y) is preferably a polyoxyalkylene polyol obtained by addition-polymerizing propylene oxide and ethylene oxide to a polyhydric alcohol. When it is such a polyoxyalkylene polyol, polymer particles will be dispersed more stably, and it becomes possible to more readily obtain a polymer-dispersed polyol having improved storage stability.

As the polyester polyol, it is possible to use, for example, a polyester polyol obtained by polycondensation of a polyhydric alcohol with a polyvalent carboxylic acid. As other examples, polyester polyols may be mentioned which are obtainable by, for example, polycondensation of a hydroxy carboxylic acid, polymerization of a cyclic ester (lactone), poly-addition of a cyclic ether to a polycarboxylic anhydride, and a transesterification of a waste polyethylene terephthalate.

As the hydrocarbon polymer having hydroxyl groups at its terminals, it is possible to use, for example, polytetramethylene glycol (PTMG) or polybutadiene polyol.

In the present invention, the polyol (X) contains at least the above polyether polyol (Y) and may further contain a polyether polyol other than the polyether polyol (Y), a polyester polyol, a hydrocarbon polymer having hydroxyl groups at its terminals, etc.

The content of the polyether polyol (Y) in the polyol (X) is preferably at least 50 mass %, more preferably at least 80 mass %, most preferably 100 mass %. When the content is at least 50 mass % and most preferably 100 mass %, the polymer particles will be stably dispersed, and it is possible to readily obtain a polymer-dispersed polyol having improved storage stability.

Monomer Having Polymerizable Unsaturated Group

In the present invention, the monomer having a polymerizable unsaturated group contains a fluorinated acrylate or a fluorinated methacrylate (hereinafter sometimes referred to as "a fluorinated monomer").

As such a fluorinated monomer is contained, the compatibility with a polyol for rigid polyurethane foams (as described hereinafter) will be increased, whereby a polymer-dispersed polyol excellent in storage stability can be obtained. Further, when it is formed into a rigid polyurethane foam, good heat-insulating properties will be obtained. Further, the dispersion stability of polymer particles in the polyol (X) will be good, and when it is formed into a rigid polyurethane foam, the dimensional stability will be improved.

In the present invention, the fluorinated monomer is preferably a monomer represented by the above formula (1), since the compatibility with the polyol (X) is high.

In the above formula (1), $R^f$ is a $C_{1-18}$ polyfluoroalkyl group. In $R^f$, the number of carbon atoms is from 1 to 18, preferably from 1 to 10, more preferably from 3 to 8.

$R^f$ is preferably such that the proportion of fluorine atoms in the alkyl group (the proportion of the number of hydrogen atoms substituted by fluorine atoms in the alkyl group) is preferably at least 80%, and it is preferred that all hydrogen atoms are substituted by fluorine atoms. When the number of carbon atoms is at most 18, the stability of a foam will be good at the time of foaming in the production of a rigid polyurethane foam.

R is a hydrogen atom or a methyl group. Namely, the monomer represented by the above formula (1) is an acrylate when R is a hydrogen atom, and it is a methacrylate when R is a methyl group.

Z is a bivalent linking group and may, for example, be an alkylene group or an arylene group, preferably an alkylene group. The alkylene group is preferably a $C_{1-10}$ alkylene group, particularly preferably a $C_{1-5}$ alkylene group, and it may be linear or branched.

Specific examples of the monomer represented by the above formula (1) will be shown below.

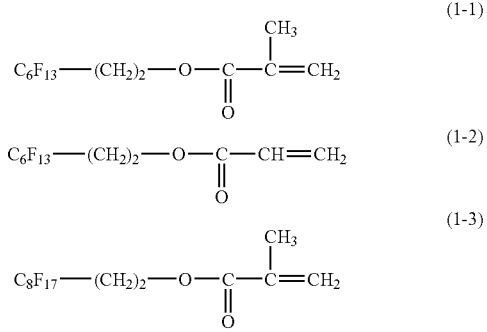

Such fluorinated monomers may be used alone or in combination as a mixture of two or more of them.

The amount of the fluorinated monomer to be used, is preferably from 10 to 100 mass %, more preferably from 30 to 100 mass %, based on the entire monomer having a polymerizable unsaturated group.

Particularly, the proportion of the monomer represented by the above formula (1) in the entire monomer having a polymerizable unsaturated group is preferably from 20 to 100 mass %, more preferably from 30 to 100 mass %, most preferably at least 40 mass %.

When the amount is at least 20 mass %, particularly at least 30 mass %, good heat-insulating properties are obtainable when it is formed into a rigid polyurethane foam.

From the foregoing, the polymer particles in the present invention may be a polymer made of a fluorinated monomer alone or a copolymer of a fluorinated monomer with another monomer having a polymerizable unsaturated group. Especially, the polymer particles are preferably a copolymer, since the dispersion stability of such polymer particles in the polyol (X) is good.

In the present invention, the monomer having a polymerizable unsaturated group which may be used in combination with the fluorinated monomer, may, for example, be a cyano group-containing monomer such as acrylonitrile, methacrylonitrile or 2,4-dicyanobutene-1; a styrene monomer such as styrene, α-methylstyrene or a halogenated styrene; an acrylic monomer such as acrylic acid, methacrylic acid or an alkyl ester thereof, an acrylamide or methacrylamide; a vinyl ester monomer such as vinyl acetate or vinyl propionate; a diene monomer such as isoprene, butadiene or another diene; an unsaturated fatty acid ester such as maleic acid diester or itaconic acid diester; a vinyl halide such as vinyl chloride, vinyl bromide or vinyl fluoride; a vinylidene halide such as vinylidene chloride, vinylidene bromide or vinylidene fluoride; a vinyl ether monomer such as methyl vinyl ether, ethyl vinyl ether or isopropyl vinyl ether; or another olefin, a halogenated olefin or macromonomer.

"A macromonomer" means a low molecular weight polymer or oligomer having a radical polymerizable unsaturated group at one terminal.

Among them, acrylonitrile, vinyl acetate or styrene is preferred, and acrylonitrile or vinyl acetate is particularly preferred, since storage stability for a longer period (for example a period of one month) will be good. Further, it is also preferred to use styrene, since the cell-opening effect will be high, and the dimensional stability will be good.

Such monomers other than the fluorinated monomer may be used alone or in combination as a mixture of two or more of them.

In a case where the fluorinated monomer and acrylonitrile are used in combination, the blend ratio of the fluorinated monomer to acrylonitrile is preferably from 10:90 to 90:10, more preferably from 30:70 to 70:30, by mass ratio. Within such a range, the storage stability for a long period will be improved. Further, the heat-insulating properties will be particularly improved when the mixture is formed into a rigid polyurethane foam.

It is preferred to use the fluorinated monomer and acrylonitrile in combination and further use, as the polyol (X), a polyether polyol (Y) having an oxyethylene group content of at least 60 mass %. It is thereby possible to obtain a polymer-dispersed polyol which is particularly excellent in the storage stability and which provides good heat-insulating properties when it is formed into a rigid polyurethane foam.

Further, in a case where the fluorinated monomer and styrene are used in combination, the blend ratio of the fluorinated monomer to styrene is preferably from 1:99 to 99:1, more preferably from 30:70 to 70:30, by mass ratio. Within such a blend ratio, when the proportion of styrene is at least the lower limit value, the storage stability will be further improved when the mixture is formed into a rigid polyurethane foam. On the other hand, when the proportion of styrene is at most the upper limit value, the heat-insulating properties will be further improved when the mixture is formed into a rigid polyurethane foam.

Further, when the fluorinated monomer, acrylonitrile and styrene are used in combination, the blend ratio of the fluorinated monomer to other monomers is preferably from 10:90 to 90:10, more preferably from 30:70 to 70:30, by mass ratio.

Further, the blend ratio of acrylonitrile to styrene is preferably from 0:100 to 100:0, more preferably from 90:10 to 10:90, by mass ratio.

Within such a blend ratio, it is possible to improve the storage stability in a case where a mixture of the polymer-dispersed polyol of the present invention and the polyol for rigid polyurethane foams, is stored, and the dimensional stability and heat-insulating properties when the mixture is formed into a rigid polyurethane foam, and it is possible to obtain such properties in good balance.

Further, when the fluorinated monomer and a vinyl acetate monomer are used in combination, the blend ratio of the fluorinated monomer to another monomer is preferably from 30:70 to 70:30, more preferably from 40:60 to 70:30, by mass ratio.

Within such a blend ratio, it is possible to obtain excellent storage stability in a case where a mixture of the polymer-dispersed polyol of the present invention and the polyol for rigid polyurethane foams, is stored, excellent dimensional stability and excellent heat-insulating properties, when the mixture is formed into a rigid polyurethane foam, and it is possible to obtain such properties in good balance.

Method for Producing Polymer-Dispersed Polyol

The method for producing a polymer-dispersed polyol of the present invention is not particularly limited so long as it is a method which comprises polymerizing a monomer having a polymerizable unsaturated group in a polyol (X) to produce a polymer-dispersed polyol for rigid polyurethane foams, having polymer particles formed by polymerization of the monomer dispersed in the polyol. For example, since the dispersion stability of polymer particles in the polyol (X) is good, a preferred method may be a method which comprises polymerizing a monomer having a polymerizable unsaturated group in the polyol (X) in the presence of a solvent, as the case requires, to let polymer particles precipitate directly thereby to obtain a polymer-dispersed polyol.

Specifically, the following methods (1) and (2) may, for example, be mentioned as the method for producing a polymer-dispersed polyol.

(1) A batch method wherein a part of the polyol (X) is charged into a reactor, and a mixture comprising the rest of the polyol (X), the monomer having a polymerizable unsaturated group, the polymerization initiator, etc. is gradually fed into the reactor with stirring to carry out the polymerization.

(2) A continuous method wherein a mixture comprising the polyol (X), the monomer having a polymerizable unsaturated group, the polymerization initiator, etc., is continuously fed into a reactor with stirring to carry out the polymerization and at the same time, a formed polymer-dispersed polyol is continuously discharged from the reactor.

In the present invention, either method (1) or (2) may be employed.

In the present invention, the amount of the entire monomer having a polymerizable unsaturated group to be used is not particularly limited, but it is preferably such an amount that the concentration of polymer particles in the polymer-dispersed polyol would be at most 50 mass %, more preferably such an amount that the concentration of polymer particles would be from 1 to 50 mass %, particularly preferably such an amount that the concentration of polymer particles would be from 2 to 45 mass %, most preferably such an amount that the concentration of polymer particles would be from 5 to 30 mass %. When the concentration of polymer particles is at most 50 mass %, polymer particles will be stably dispersed in the polyol (X), and the storage stability will be more improved. Further, a proper viscosity will be obtained, and the solution stability of the polymer-dispersed polyol will be improved.

In the method for producing a polymer-dispersed polyol, as the polymerization initiator, it is common to use one to form a radical group to initiate the polymerization of the monomer having a polymerizable unsaturated group.

Specifically, it may, for example, be 2,2-azobis-isobutyronitrile (hereinafter abbreviated as "AIBN"), 2,2-azobis-2-methylbutyronitrile (hereinafter abbreviated as "AMBN"), 2,2-azobis-2,4-dimethylvaleronitrile, benzoyl peroxide, diisopropyl peroxydicarbonate, acetyl peroxide, di-tert-butyl peroxide or a persulfate. Among them, AIBN or AMBN is preferred.

Such polymerization initiators may be used alone or in combination as a mixture of two or more of them.

The amount of the polymerization initiator to be used is preferably from 0.01 to 10 parts by mass per 100 parts by mass of the total of the polyol (X), the entire monomer having a polymerizable unsaturated group including the fluorinated monomer and a stabilizer or a graft agent to be used as the case requires (as described hereinafter).

The solvent may, for example, be an alcohol such as methanol, ethanol, isopropanol, butanol, cyclohexanol or benzyl alcohol; an aliphatic hydrocarbon such as pentane, hexane, cyclohexane or hexene; an aromatic hydrocarbon such as benzene, toluene or xylene; a ketone such as acetone, methyl ethyl ketone or acetophenone; an ester such as ethyl acetate or butyl acetate; an ether such as isopropyl ether, tetrahydrofuran, benzyl ethyl ether, acetal, anisole or methyl-tert-butyl ether; a halogenated hydrocarbon such as chlorobenzene, chloroform, dichloroethane or 1,1,2-trichlorotrifluoroethane; a nitro compound such as nitrobenzene; a nitrile such as acetonitrile or benzonitrile; an amine such as trimethylamine, triethylamine, tributylamine or dimethylaniline; an amide such as N,N-dimethylformamide or N-methylpyrrolidone; or a sulfur compound such as dimethyl sulfoxide or sulfolane.

Such solvents may be used alone or in combination as a mixture of two or more of them.

In a case where a solvent is used in the production of the polymer-dispersed polyol, the blend ratio of the solvent to the polyol (X) is preferably from 0:100 to 60:40, more preferably from 0:100 to 40:60, by mass ratio. When the blend ratio is within such a range, agglomeration of polymer particles will be suppressed, and it becomes possible to readily obtain a polymer-dispersed polyol wherein polymer particles are stably dispersed.

After completion of the polymerization of the monomer having a polymerizable unsaturated group, the solvent is removed. The method for removing the solvent is carried out usually by heating under reduced pressure. Otherwise, it can be carried out by heating under normal pressure or at a normal temperature under reduced pressure. At that time, an unreacted monomer will be removed together with the solvent.

The polymerization reaction of the monomer having a polymerizable unsaturated group in the polyol (X) is carried out at a temperature of at least the decomposition temperature of the polymerization initiator, usually from 80 to 160° C., preferably from 90 to 150° C., particularly preferably from 100 to 130° C.

Further, in the present invention, a stabilizer or a graft agent may be used in order to improve the dispersion stability of polymer particles in the polymer-dispersed polyol.

A preferred one as such a stabilizer or a graft agent may, for example, be a compound having an unsaturated bond in its molecule. Specifically, it may, for example, be a high molecular weight polyol or monool obtained by reacting an alkylene oxide with an active hydrogen compound having an unsaturated bond-containing group such as a vinyl group, an allyl group or an isopropyl group as an initiator; a high molecular weight polyol or monool obtained by reacting an unsaturated carboxylic acid or an acid anhydride thereof, such as maleic anhydride, itaconic anhydride, maleic acid, fumaric acid, acrylic acid or methacrylic acid, with a polyol and then, adding an alkylene oxide such as propylene oxide or ethylene oxide, as the case requires; a reaction product of an unsaturated alcohol such as 2-hydroxyethyl acrylate or butenediol, another polyol and a polyisocyanate; or a reaction product of an unsaturated epoxy compound such as allyl glycidyl ether with a polyol.

Such a stabilizer or a graft agent may or may not have a hydroxyl group, but preferably has a hydroxyl group.

The stabilizer or the graft agent may be incorporated by mixing it together with the polyol (X), the monomer having a polymerizable unsaturated group and the polymerization initiator, etc.

After completion of the polymerization reaction, the obtained polymer-dispersed polyol may be used as it is, as a material for rigid polyurethane foams, or the obtained polymer-dispersed polyol may be used after removing an unreacted monomer by reduced pressure treatment of the polyol. Preferred is the latter.

Polyol for Rigid Polyurethane Foams

The polymer-dispersed polyol to be produced by the present invention is one having a high compatibility with a polyol for rigid polyurethane foams and being excellent in storage stability.

Such a polyol for rigid polyurethane foams may, for example, be a polyol which is commonly used for the production of rigid polyurethane foams, such as a polyether polyol, a polyester polyol or a hydrocarbon polymer having hydroxyl groups at its terminals.

The polyol for rigid polyurethane foams preferably has from 2 to 8 functional groups on average.

Here, the number of functional groups means the number of functional groups (hydroxyl groups) of the polyol to be reacted with the polyisocyanate component at the time of producing a rigid polyurethane foam. For example, in the case of a polyether polyol, it is equal to the active hydrogen number in the initiator used for the preparation of the polyether polyol.

The polyol for rigid polyurethane foams may specifically be the same one as exemplified with respect to the above polyol (X).

When a mixture (hereinafter referred to as "the polyol component") of the polyol for rigid polyurethane foams and the polymer-dispersed polyol of the present invention, is used for the production of a rigid polyurethane foam, the average hydroxyl value of the polyol component is preferably from 200 to 800 mgKOH/g, more preferably from 200 to 700 mgKOH/g, further preferably from 200 to 600 mgKOH/g.

When the average hydroxyl value is at least 200 mgKOH/g, the strength of the obtainable rigid polyurethane foam is readily attainable, such being desirable. When the average hydroxyl value is at most 800 mgKOH/g, the obtainable rigid polyurethane foam is less likely to be brittle, such being desirable.

In the present invention, the average hydroxyl value means an average value of hydroxyl values of all polyol compounds constituting the polyol component (Z).

In the preparation of the above polyol component, the blend ratio of the polymer-dispersed polyol to the polyol for rigid polyurethane foams is such that the proportion of the polymer-dispersed polyol in the polyol component is preferably at least 0.01 mass %, more preferably at least 0.1 mass %, further preferably at least 0.9 mass %. On the other hand, the proportion of the polymer-dispersed polyol is preferably at most 10 mass %, more preferably at most 7 mass %.

Further, the proportion of polymer particles in the polyol component is preferably at least 0.001 mass %, more preferably at least 0.01 mass %, further preferably at least 0.1 mass %. On the other hand, the proportion of polymer particles is preferably at most 5 mass %, more preferably at most 1 mass %.

When the proportions of the polymer-dispersed polyol and the polymer particles in the polyol component are at least the lower limit values, respectively, the compatibility of the two will be more improved, and the storage stability will be further improved. Further, when such a polyol component is formed into a rigid polyurethane foam, both the dimensional stability and heat-insulating properties will be improved. On the other hand, when they are at most the above upper limit values, the storage stability will be improved, and a rigid polyurethane foam can be stably produced. Further, a proper viscosity as a polyol component can readily be obtained, and the solution stability will be improved.

For the production of a rigid polyurethane foam, a method of reacting the polyol component with a polyisocyanate component in the presence of a blowing agent, a surfactant and a catalyst, may, for example, be mentioned.

At the time of the production, it is preferred that the polyol for rigid polyurethane foams and the polymer-dispersed polyol of the present invention are preliminarily mixed to prepare a polyol component, and a mixture (polyol system liquid) of the polyol component and some or all other than the polyisocyanate component, is prepared.

Here, the blowing agent may be preliminarily incorporated to the polyol system liquid, or it may be incorporated after the polyisocyanate component is mixed to the polyol system liquid. It is especially referred that the blowing agent is preliminarily incorporated to the polyol system liquid.

By the method for producing a polymer-dispersed polyol of the present invention, it is possible to produce a polymer-dispersed polyol which has high compatibility with the polyol for rigid polyurethane foams and is excellent in storage stability, and which provides good heat-insulating properties when it is formed into a rigid polyurethane foam.

Further, the rigid polyurethane foam produced by using the polymer-dispersed polyol, is excellent in both the heat-insulating properties and dimensional stability.

EXAMPLES

Now, the present invention will be described in further detail with reference to Examples. However, it should be understood that the present invention is by no means restricted by such Examples. Production Examples 1 to 14 are working examples of the present invention, and Production Example 15 is a comparative example. Further, Test Examples 1 to 7, 9 to 15 and 17 to 23 show the results of evaluation of the storage stability of the polymer-dispersed polyols produced in Examples, and Test Examples 8, 16 and 24 show the results of evaluation of storage stability in a case where PTFE powder was used instead of the polymer-dispersed polyol of the present invention. Production Example, 16 to 30, 34, 35, 38, 39, 42 and 43 show the results of evaluation of the physical properties of rigid polyurethane foams produced by using the polymer-dispersed polyols produced in Examples, and Production Examples 31 to 33, 36, 37, 40, 41, 44 and 45 show the results of evaluation of the physical properties of rigid urethane foams produced without using the polymer-dispersed polyols of the present invention.

In the following Examples, the hydroxyl value was measured in accordance with JIS K1557 (1970 edition). The viscosity was measured in accordance with JIS K1557 (1970 edition). With respect to the concentration (solid content) of polymer particles, the charged amount of the monomer having a polymerizable unsaturated group was taken as the concentration (solid content) of polymer particles.

Evaluation of Polymer-Dispersed Polyol

In the blend ratios shown in Tables 1 and 2, polymer-dispersed polyols F1 to F15 were produced by the following Production Examples 1 to 15.

The blend compositions at the time of the production of the polymer-dispersed polyols, the hydroxyl values (mgKOH/g), viscosities (mPa·s) and concentrations (solid content: mass %) of polymer particles of the obtained polymer-dispersed polyols F1 to F15 are, respectively, shown in Table 1.

In the blend compositions in Tables 1 and 2, polyols D to G, macromonomers M1 and M2, and a monomer having a polymerizable unsaturated group, are represented by "g", and the polymerization initiator is represented by the value of "parts by mass" per 100 parts by mass of the total of polyol D to G and the entire monomer having a polymerizable unsaturated group.
Materials Used
Polyether Polyol (Y)
Polyol D: A polyoxyalkylene polyol having an oxyethylene group content of 65 mass % in polyol D and a hydroxyl value of 48 mgKOH/g, prepared by using glycerin as an initiator and addition-polymerizing ethylene oxide is to the glycerin and then addition-polymerizing a mixture of propylene oxide (PO) and ethylene oxide (EO) [PO/EO=46.2/53.8 (mass ratio)] thereto.
Polyol E: A polyoxyalkylene polyol having an oxyethylene group content of 60 mass % in polyol E and a hydroxyl value of 28 mgKOH/g, prepared by using glycerin as an initiator, and addition-polymerizing ethylene oxide to the glycerin and then addition-polymerizing a mixture of propylene oxide (PO) and ethylene oxide (EO) [PO/EO=48.0/52.0 (mass ratio)] thereto.
Polyol F: A polyoxyalkylene polyol having an oxyethylene group content of 0 mass % in polyol F and a hydroxyl value of 760 mgKOH/g, prepared by using ethylenediamine as an initiator, and addition-polymerizing only PO to the ethylenediamine.
Polyol G: A polyoxyalkylene polyol having an oxyethylene group content of 0 mass % in polyol G and a hydroxyl value of 650 mgKOH/g, prepared by using glycerin as an initiator, and addition-polymerizing only PO to the glycerin.
Fluorinated Monomer
Fluorinated Monomer (f): A monomer represented by the following chemical formula (1-1) (manufactured by Asahi Glass Company, Limited) was used:

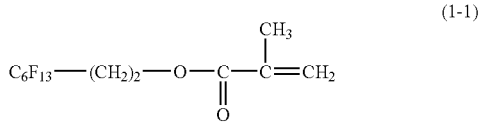

(1-1)

Other Monomers Having Polymerizable Unsaturated Groups
Acrylonitrile (manufactured by Junsei Chemical Co., Ltd.)
Styrene (manufactured by Godo Co., Ltd.)
Vinyl acetate (manufactured by Junsei Chemical Co., Ltd.)
Polymerization Initiator
2,2-azobis-2-methylbutyronitrile (tradename: ABN-E, manufactured by Japan Hydrazine Co., Inc., hereinafter abbreviated as "AMBN")
Macromonomer
Macromonomer M1: A macromonomer having a polymerizable unsaturated group and having a hydroxyl value of 40 mgKOH/g, obtained by charging polyol D, tolylene diisocyanate (tradename: T-80, manufactured by Nippon Polyurethane Industry Co., Ltd.) and 2-hydroxyethyl methacrylate (manufactured by Junsei Chemical Co., Ltd.) in a molar ratio of polyol D/tolylene diisocyanate/2-hydroxyethyl methacrylate=1/1/1 and reacting them at 60° C. for one hour and further at 80° C. for 6 hours.
Macromonomer M2: A macromonomer having a polymerizable unsaturated group and having a hydroxyl value of 21 mgKOH/g, obtained by charging polyol E, tolylene diisocyanate (tradename: T-80, manufactured by Nippon Polyurethane Industry Co., Ltd.) and 2-hydroxyethyl methacrylate (manufactured by Junsei Chemical Co., Ltd.) in a molar ratio of polyol E/tolylene diisocyanate/2-hydroxyethyl methacrylate=1/1/1 and reacting them at 60° C. for one hour and then at 80° C. for 6 hours.

Production of Polymer-Dispersed Polyols

Production Example 1

Production of Polymer-Dispersed Polyol F1

Into a 5 L pressure reactor, a 70 mass % portion of polyol D was charged, and while maintaining the temperature at 120° C., a mixture of the remaining 30 mass % of polyol D, acrylonitrile, the fluorinated monomer (f) and the polymerization initiator (AMBN) was fed with stirring over a period of two hours. After completion of the feeding, stirring was continued for about 0.5 hour at the same temperature. Upon confirming by the above described method that the conversion of the monomer was at least 80%, the reaction was terminated. Thereafter, an unreacted monomer was removed under reduced pressure at 120° C. for 8 hours to prepare polymer-dispersed polyol F1. The results are shown in Table 1.

Production Example 2

Production of Polymer-Dispersed Polyol F2

Into a 5 L pressure reactor, a 70 mass % portion of polyol D was charged, and while the temperature was maintained at 120° C., a mixture of the remaining 30 mass % portion of polyol D, acrylonitrile, styrene, the fluorinated monomer (f) and the polymerization initiator (AMBN) was fed with stirring over a period of one hour. After completion of the feeding, stirring was continued for about 0.5 hour at the same temperature. Upon confirming by the above method that the conversion of the monomer was at least 80%, the reaction was terminated. Thereafter, an unreacted monomer was removed under reduced pressure at 120° C. for 6 hours to obtain polymer-dispersed polyol F2. The results are shown in Table 1.

Production Examples 3 to 7

Production of Polymer-Dispersed Polyols F3 to F7

Polymer-dispersed polyols F3 to F7 were respectively produced in the same manner as in Production Example 1 except that the monomer having a polymerizable unsaturated group as identified in Table 1 was used. The results are shown in Table 1.

Production Example 8

Production of Polymer-Dispersed Polyol F8

Into a 5 L pressure reactor, a 90 mass % portion of polyol D out of 100 mass % of the entire amount was charged, and while the temperature was maintained at 120° C., a mixture of the remaining 10 mass % portion of vinyl acetate, the fluorinated monomer (f) and the polymerization initiator (AMBN) was fed with stirring over a period of two hours. After completion of the feeding, stirring was continued for about 0.5 hour at the same temperature. Upon confirming by the above described method that the conversion of the monomer was at least 80%, the reaction was terminated. Thereafter, an unreacted monomer was removed under reduced pressure at 120° C. for 3 hours to obtain polymer-dispersed polyol F8. The results are shown in Table 2.

Production Example 9

Production of Polymer-Dispersed Polyol F9

Into a 5 L pressure reactor, out of 100 mass % of the entire amount, a 89 mass % portion of polyol D and a 1 mass % portion of macromonomer M1 were charged, and while the temperature was maintained at 120° C., a mixture of the remaining 10 mass % portion of vinyl acetate, the fluorinated monomer (f) and the polymerization initiator (AMBN) was fed with stirring over a period of two hours. After completion of the feeding, stirring was continued for about 0.5 hour at the same temperature. Upon confirming by the above described method that the conversion of the monomer was at least 80%, the reaction was terminated. Thereafter, an unreacted monomer was removed under reduced pressure at 120° C. for 3 hours to obtain polymer-dispersed polyol F9. The results are shown in Table 2.

Production Example 10

Production of Polymer-Dispersed Polyol F10

Into a 5 L pressure reactor, a 80 mass % portion of polyol D out of 100 mass % of the entire amount was charged, and while the temperature was maintained at 120° C., a mixture of the remaining 20 mass % portion of vinyl acetate, the fluorinated monomer (f) and the polymerization initiator (AMBN) was fed with stirring over a period of two hours. After completion of the feeding, stirring was continued for about 0.5 hour at the same temperature. Upon confirming by the above method that the conversion of the monomer was at least 80%, the reaction was terminated. Thereafter, an unreacted monomer was removed under reduced pressure at 120° C. for 3 hours to obtain polymer-dispersed polyol F10. The results are shown in Table 2.

Production Examples 11 and 13

Production of Polymer-Dispersed Polyols F11 and 13

Polymer-dispersed polyols F11 and F13 were, respectively, produced in the same manner as in Production Example 9 except that the composition of polyol D and the monomer having a polymerizable unsaturated group was changed as shown in Table 2. The results are shown in Table 2.

Production Example 12

Production of Polymer-Dispersed Polyol F12

Into a 5 L pressure reactor, out of 100 mass % of the entire amount, a 29.2 mass % portion of polyol D, a 49.8 mass % portion of polyol G and a 1 mass % portion of macromonomer M1 were charged, and while the temperature was maintained at 120° C., a mixture of the remaining 20 mass % portion of vinyl acetate, the fluorinated monomer (f) and the polymerization initiator (AMBN) was fed with stirring over a period of two hours. After completion of the feeding, stirring was continued for about 0.5 hour at the same temperature. Upon confirming by the above method that the conversion of the monomer was at least 80%, the reaction was terminated. Thereafter, an unreacted monomer was removed under reduced pressure at 120° C. for 3 hours to obtain polymer-dispersed polyol F12. The results are shown in Table 2.

Production Example 14

Production of Polymer-Dispersed Polyol F14

Into a 5 L pressure reactor, out of 100 mass % of the entire amount, a 79 mass % portion of polyol D and a 1 mass % portion of macromonomer M2 were charged, and while the temperature was maintained at 120° C., a mixture of the remaining 20 mass % portion of vinyl acetate, the fluorinated monomer (f) and the polymerization initiator (AMBN) was fed with stirring over a period of two hours. After completion of the feeding, stirring was continued for about 0.5 hour at the same temperature. Upon confirming by the above method that the conversion of the monomer was at least 80%, the reaction was terminated. Thereafter, an unreacted monomer was removed under reduced pressure at 120° C. for 3 hours to obtain polymer-dispersed polyol F14. The results are shown in Table 2.

Production Example 15

Production of Polymer-Dispersed Polyol F15

Into a 5 L pressure reactor, polyol D, polyol F, polyol G, acrylonitrile, vinyl acetate and the polymerization initiator (AMBN) were all charged, then the temperature was raised with stirring, and while the reaction solution was maintained at 80° C., the reaction was carried out for 10 hours. Upon confirming by the above method that the conversion of the monomer was at least 80%, the reaction was terminated. Thereafter, an unreacted monomer was removed by heating and deaeration under reduced pressure at 110° C. under 20 Pa for two hours to obtain polymer-dispersed polyol F15. The results are shown in Table 2.

TABLE 1

|  | Pro. Ex. 1 | Pro. Ex. 2 | Pro. Ex. 3 | Pro. Ex. 4 | Pro. Ex. 5 | Pro. Ex. 6 | Pro. Ex. 7 |
|---|---|---|---|---|---|---|---|
| Polyol D | 1170 | 1170 | 1170 | 630 | 400 |  |  |
| Polyol E |  |  |  |  |  | 1170 | 1170 |
| Polyol F |  |  |  |  |  |  |  |
| Polyol G |  |  |  |  |  |  |  |
| Fluorinated monomer (f) | 65 | 65 | 65 | 70 | 50 | 65 | 65 |
| Acrylonitrile | 65 | 52 | 39 |  |  | 65 |  |
| Styrene |  | 13 | 26 |  |  |  | 65 |
| Vinyl acetate |  |  |  |  | 50 |  |  |
| Polymerization initiator (parts by mass) | 6.5 | 6.5 | 6.5 | 3.5 | 2.5 | 6.5 | 6.5 |

TABLE 1-continued

|  | Pro. Ex. 1 | Pro. Ex. 2 | Pro. Ex. 3 | Pro. Ex. 4 | Pro. Ex. 5 | Pro. Ex. 6 | Pro. Ex. 7 |
|---|---|---|---|---|---|---|---|
| Hydroxyl value (mgKOH/g) | 47 | 47 | 47 | 47 | 41 | 32 | 30 |
| Viscosity (mPa·s) | 1060 | 1076 | 1284 | 1060 | 1800 | 1290 | 1600 |
| Concentration of polymer particles (solid content: mass %) | 10 | 10 | 10 | 10 | 20 | 10 | 10 |
| Name | F1 | F2 | F3 | F4 | F5 | F6 | F7 |

TABLE 2

|  | Pro. Ex. 8 | Pro. Ex. 9 | Pro. Ex. 10 | Pro. Ex. 11 | Pro. Ex. 12 | Pro. Ex. 13 | Pro. Ex. 14 | Pro. Ex. 15 |
|---|---|---|---|---|---|---|---|---|
| Polyol D | 450 | 445 | 400 | 395 | 146 | 395 | 395 | 945 |
| Polyol E |  |  |  |  |  |  |  | 900 |
| Polyol F |  |  |  |  |  |  |  |  |
| Polyol G |  |  |  |  | 249 |  |  | 905 |
| Macromonomer M1 |  | 5 |  | 5 | 5 | 5 |  |  |
| Macromonomer M2 |  |  |  |  |  |  | 5 |  |
| Fluorinated monomer (f) | 25 | 25 | 50 | 50 | 50 | 40 | 40 |  |
| Acrylonitrile |  |  |  |  |  |  |  | 150 |
| Styrene |  |  |  |  |  |  |  |  |
| Vinyl acetate | 25 | 25 | 50 | 50 | 50 | 60 | 60 | 600 |
| Polymerization initiator (parts by mass) | 2.5 | 2.5 | 2.5 | 2.5 | 2.5 | 2.5 | 2.5 | 30 |
| Hydroxyl value (mgKOH/g) | 46 | 45 | 41 | 41 | 373 | 40 | 40 | 320 |
| Viscosity (mPa·s) | 1810 | 1930 | 1750 | 7120 | 1950 | 4060 | 5400 | 1500 |
| Concentration of polymer particles (solid content: mass %) | 10 | 10 | 20 | 20 | 20 | 20 | 20 | 20 |
| Name | F8 | F9 | F10 | F11 | F12 | F13 | F14 | F15 |

Evaluation of Storage Stability

In the blend ratios of Test Examples 1 to 24 as shown in Tables 3 to 5, the polymer-dispersed polyols F1 to F14 produced in Production Examples 1 to 14 and the following polytetrafluoroethylene (PTFE) powder were, respectively, added to polyol mixtures of the following polyols A to C or H and I to prepare evaluation samples.

And, the evaluation samples were stored at 23° C. for one week, whereupon the appearances (separation states) of the evaluation samples after the storage were visually observed, and the storage stability (one week) was evaluated by the following evaluation standards.

Evaluation Standards

○: The sample was a uniform dispersion.

X: Polymer particles or PTFE powder, and the polyol, were separated.

Materials Used

Polytetrafluoroethylene (PTFE) powder (tradename: polytetrafluoroethylene resin powder fluon L-173, manufactured by Asahi Glass Company, Limited)

Polyols for Rigid Polyurethane Foams

Polyol A: A polyether polyol having a hydroxyl value of 350 mgKOH/g and a proportion of EP to the total of EP and PO being 33 mass %, obtained by using tolylene diamine as an initiator and addition-polymerizing EO, PO and EO in this order to the tolylene diamine.

Polyol B: A polyether polyol having a hydroxyl value of 350 mgKOH/g, prepared by using N-(2-aminoethyl)piperazine as an initiator and addition-polymerizing only EO to the N-(2-aminoethyl)piperazine.

Polyol C: A polyether polyol having a hydroxyl value of 380 mgKOH/g, prepared by using a mixture of sucrose and glycerin (mass ratio of 5:4) as an initiator and addition-polymerizing only PO to the mixture.

Polyol H: A polyester polyol having a hydroxyl value of 200 mgKOH/g, obtained by poly-condensing diethylene glycol with terephthalic acid.

Polyol I: A polyol having a hydroxyl value of 300 mgKOH/g and a proportion of EO to the total amount of added PO and EO being 60 mass %, obtained by adding PO and EO in this order to a Mannich condensate obtained by reacting nonylphenol, formaldehyde and diethanolamine in a molar ratio of 1:1.4:2.1.

Polyol J: A polyether polyol having a hydroxyl value of 540 mgKOH/g, obtained by addition-polymerizing only PO to a Mannich compound obtained by reacting anniline (1 mol), phenol (0.99 mol), paraformaldehyde (0.64 mol) and diethanolamine (2.2 mol).

Polyol K: A polyether polyol having a hydroxyl value of 760 mgKOH/g, obtained by using ethylene diamine as an initiator and addition-polymerizing only PO to the ethylene diamine.

Polyol L: A polyether polyol having a hydroxyl value of 400 mgKOH/g, prepared by using glycerin as an initiator and addition-polymerizing only PO to the glycerin.

TABLE 3

|  | Test Ex. 1 | Test Ex. 2 | Test Ex. 3 | Test Ex. 4 | Test Ex. 5 | Test Ex. 6 | Test Ex. 7 | Test Ex. 8 |
|---|---|---|---|---|---|---|---|---|
| Polyol A | 40 | 40 | 40 | 40 | 40 | 40 | 40 | 40 |
| Polyol B | 20 | 20 | 20 | 20 | 20 | 20 | 20 | 20 |
| Polyol C | 39.7 | 39.7 | 39.7 | 39.7 | 39.7 | 39.7 | 39.7 | 39.7 |
| F1 | 0.3 | | | | | | | |
| F2 | | 0.3 | | | | | | |
| F3 | | | 0.3 | | | | | |
| F4 | | | | 0.3 | | | | |
| F5 | | | | | 0.3 | | | |
| F6 | | | | | | 0.3 | | |
| F7 | | | | | | | 0.3 | |
| PTFE powder | | | | | | | | 0.3 |
| Storage stability (23° C., one week) | ○ | ○ | ○ | ○ | ○ | ○ | ○ | X |

TABLE 4

|  | Test Ex. 9 | Test Ex. 10 | Test Ex. 11 | Test Ex. 12 | Test Ex. 13 | Test Ex. 14 | Test Ex. 15 | Test Ex. 16 |
|---|---|---|---|---|---|---|---|---|
| Polyol A | 40 | 40 | 40 | 40 | 40 | 40 | 40 | 40 |
| Polyol B | 20 | 20 | 20 | 20 | 20 | 20 | 20 | 20 |
| Polyol C | 37 | 37 | 37 | 37 | 37 | 37 | 37 | 37 |
| F8 | 3 | | | | | | | |
| F9 | | 3 | | | | | | |
| F10 | | | 3 | | | | | |
| F11 | | | | 3 | | | | |
| F12 | | | | | 3 | | | |
| F13 | | | | | | 3 | | |
| F14 | | | | | | | 3 | |
| PTFE powder | | | | | | | | 3 |
| Storage stability (23° C., one week) | ○ | ○ | ○ | ○ | ○ | ○ | ○ | X |

TABLE 5

|  | Test Ex. 17 | Test Ex. 18 | Test Ex. 19 | Test Ex. 20 | Test Ex. 21 | Test Ex. 22 | Test Ex. 23 | Test Ex. 24 |
|---|---|---|---|---|---|---|---|---|
| Polyol H | 70 | 70 | 70 | 70 | 70 | 70 | 70 | 70 |
| Polyol I | 29 | 29 | 29 | 29 | 29 | 29 | 29 | 29 |
| F8 | 1 | | | | | | | |
| F9 | | 1 | | | | | | |
| F10 | | | 1 | | | | | |
| F11 | | | | 1 | | | | |
| F12 | | | | | 1 | | | |
| F13 | | | | | | 1 | | |
| F14 | | | | | | | 1 | |
| PTFE powder | | | | | | | | 1 |
| Storage stability (23° C., one week) | ○ | ○ | ○ | ○ | ○ | ○ | ○ | X |

From the results shown in Tables 3 to 5, it was confirmed that the storage stability was good in Test Examples 1 to 7, 9 to 15 and 17 to 23 wherein polymer-dispersed polyols F1 to F14 were used.

On the other hand, it was confirmed that the storage stability was poor in Test Examples 8, 16 and 24 wherein PTFE powder was used.

Thus, it was confirmed that polymer-dispersed polyols F1 to F14 produced by the method for producing a polymer-dispersed polyol of the present invention have high compatibility with a polyol for rigid polyurethane foams and are excellent in storage stability.

Evaluation of Rigid Polyurethane Foams

In the blend ratios of Production Examples 16 to 45 as shown in Tables 6 to 10, rigid polyurethane foams were prepared by the following method.

In the blend compositions in Tables 6 to 10, units of the amounts of various materials used are "parts by mass".

Materials Used

Polyol component

Polyols A to C and H to L, PTFE powder

Polyol D, Polymer-dispersed polyols F1 to F4, F6, F8, F9 to F15

Flame Retardant: tris(2-chloropropyl)phosphate (tradename: TMCPP, manufactured by DAIHACHI CHEMICAL INDUSTRY CO., LTD.)

Blowing agent A: water
Blowing Agent B: cyclopentane (tradename: MARUKA-SOL FH, manufactured by Maruzen Petrochemical Co., Ltd.)
Blowing Agent C: 1,1,1,3,3-pentafluoropropane (HFC-245fa, manufactured by Honeywell)
Surfactant: silicone surfactant (tradename: SZ-1671, manufactured by Dow Corning Toray Co., Ltd.)
Catalyst A: N,N,N',N'-tetramethylhexamethylene diamine (tradename: TOYOCAT-MR, manufactured by TOSOH CORPORATION)

Catalyst B: triethylene diamine (tradename: TEDA-L33, manufactured by TOSOH CORPORATION)

Catalyst C: N,N',N"-tris(dimethylaminopropyl)hexahydro-S-triazine (tradename: POLYCAT 41, manufactured by AIR PRODUCTS)

Catalyst D: a diethylene glycol solution of potassium 2-ethylhexanoate (potassium concentration: 15%, tradename: DABCO K-15, manufactured by AIR PRODUCTS)

Catalyst E: mixture of amino alcohols (tradename: TOYOCAT-RX7, manufactured by TOSOH CORPORATION)

Catalyst F: N,N-dimethylcyclohexylamine (tradename: KAOLIZER No. 10, manufactured by KAO CORPORATION)

Polyisocyanate: polymethylene phenyl polyisocyanate (Crude MDI) (tradename: MR-200, manufactured by Nippon Polyurethane Industry Co., Ltd.)

Production of Rigid Polyurethane Foams

Into a 1 L beaker, 100 parts by mass of the polyol component, the blowing agent, the surfactant, the flame retardant and the catalyst were, respectively, introduced in the blend ratios shown in Tables 6 to 10, and they were well mixed by a stirrer to obtain a polyol system liquid.

The amount of the polyisocyanate used, was 110 or 130 by isocyanate index (INDEX) in a case where the blowing agent was water alone, 105 by isocyanate index in a case where a hydrocarbon compound was used as a blowing agent, and 110 by isocyanate index in a case where a hydrofluorocarbon compound was used as a blowing agent, and a comparison was made in each case. The isocyanate index (INDEX) is a value represented by 100 times the proportion of the number of isocyanate groups based on the total equivalent of active hydrogen of the polyol composition and other active hydrogen compounds.

The liquid temperature of both materials of the polyol system liquid and the polyisocyanate component was maintained at 20° C., followed by stirring and mixing at a rotational speed of 3,000 rpm for 5 seconds. Then, the mixture was put into a wooden box of 200×200×200 mm, and free foaming was carried out to form a rigid polyurethane foam.

Evaluation of Rigid Polyurethane Foams

With respect to the rigid polyurethane foam obtained in each Production Example, the gel time (seconds), the box free density (unit: kg/m³) as the entire density, the compression strength (unit: MPa), the high temperature shrinkage (unit: %) as dimensional stability, and the thermal conductivity (unit: mW/m·K) at 24° C. as heat-insulating properties, were respectively measured. Further, the following evaluation was carried out for storage stability. The result, are shown in Table 3.

For the measurement of the gel time, a wire was inserted into the foam during foaming, and the time (seconds) until the foam gets sticky at the time when the wire was pulling out was measured.

The entire density (box free density) was measured in accordance with JIS K7222 (1998 Edition) and obtained from the mass and the volume.

The compression strength was measured in accordance with JIS A9511. The size of the test specimen was 5 cm×5 cm×5 cm. The compression strengths in the parallel direction (//) and the vertical direction (⊥) to the gravity direction, were measured. In Table 3, "//+⊥" represents the compression strength obtained by adding the compression strength in the parallel direction (//) and the compression strength in the vertical direction (⊥).

Evaluation of Dimensional Stability

The high temperature shrinkage was measured by a method in accordance with ASTM D 2126-75, and in the case where the blowing agent was water only, the high temperature dimensional stability and the wet heat dimensional stability were evaluated, and in the case where a hydrocarbon compound or a hydrofluorocarbon compound was used in combination as the blowing agent, the low temperature dimensional stability was evaluated.

As a sample, the rigid polyurethane foam in each Example was used, and after aging it for one hour, a test specimen of 100 mm in length (Z)×150 mm in width (X)×75 mm in thickness (Y) was cut out and used.

The above test specimen was stored for 24 hours or 50 hours in an atmosphere of 70° C. for the high temperature dimensional stability, in an atmosphere of 70° C. under a relative humidity of 95% for the wet heat dimensional stability or in an atmosphere of −30° C. or 0° C. for the low temperature dimensional stability, whereby the increased length (thickness) was represented by the dimensional change (unit: %) to the length (thickness) before the storage. Namely, the dimensional changes were measured under two conditions in three directions (X, Y and Z) i.e. in a total of six directions.

Here, in the dimensional change, a negative numerical value means shrinkage, and the absolute value being large means a large dimensional change. The dimensional change was evaluated by the following evaluation standards.

Evaluation Standards

⊚: The maximum absolute value among dimensional changes in six directions was less than 1%.

○: The maximum absolute value among dimensional changes in six directions was at least 1% and less than 5%.

Δ: The maximum absolute value among dimensional changes in six directions was at least 5% and less than 10%.

X: The maximum absolute value among dimensional changes in six directions was at least 10%.

Evaluation of Heat-Insulating Properties

The thermal conductivity (unit: mW/m·K) was measured in accordance with JIS A1412 by means of a thermal conductivity-measuring apparatus (tradename: AUTO λ HC-074 model, manufactured by EKO Instruments Co., Ltd.).

The heat-insulating properties were evaluated by the following evaluation standards.

Evaluation Standards

The following standards were adopted in a case where the blowing agent was water alone.

○: The thermal conductivity was at most 27.

X: The thermal conductivity was higher than 27.

The following standards were adopted in a case where a hydrocarbon compound was used in combination as a blowing agent.

○: The thermal conductivity was at most 22.

X: The thermal conductivity was higher than 22.

The following standards were adopted in a case where a hydrofluorocarbon compound was used in combination as a blowing agent.

○: The thermal conductivity was at most 21.

X: The thermal conductivity was higher than 21.

Evaluation of Storage Stability

In the blend ratios of Production Examples 11 to 45 as shown in Tables 6 to 10, polyols A to C and H to L were mixed, and then, F1 to F4, F6, F8, F9 to F15, PTFE powder, polyol D were, respectively, added and mixed to prepare 300 g of polyol mixtures, and each polyol mixture was put into a glass bottle provided with a cover. And it was stored at 23° C. for one week, or at 23° C. for one month. From the upper layer of the polyol mixture after the storage, 100 g of the upper layer liquid was withdrawn by a syringe, the intermediate liquid was disposed so that 100 g of the lower layer liquid could be taken from the lower layer, and from the lower layer, 100 g of the lower layer liquid of the polyol mixture was sampled.

Then, a rigid polyurethane foam was produced in the same manner as in "Production of rigid polyurethane foams" except that in the above "Production of rigid polyurethane foams", 100 parts by mass of the upper layer liquid or 100 parts by mass of the lower layer liquid was used instead of 100 parts by mass of the polyol component.

And, from the characteristics of the obtained rigid polyurethane foam, the storage stability was evaluated on the basis of the following evaluation standards.

If the storage stability is poor, the polymer-dispersed polyol will migrate to the upper layer or lower layer during the storage, and the upper and lower compositions of the polyol mixture are different, which is influential over the properties of the rigid polyurethane foam produced by using such a polyol mixture. Accordingly, the storage stability can be evaluated by the foaming state in the case of using each of the upper layer liquid and the lower layer liquid, or by the dimensional change of the obtainable rigid polyurethane foam.

Evaluation Standards

○: No foaming failure is observed in either one obtained by foaming the upper layer liquid or the lower layer liquid, and the absolute value of the dimensional change of the rigid polyurethane foam was less than 5% in each case.

X: Foaming failure was observed in either one obtained by foaming the upper layer liquid or the lower layer liquid, or the absolute value of the dimensional change of either one of the rigid polyurethane foams was at least 5%.

TABLE 6

| | | Pro. Ex. 16 | Pro. Ex. 17 | Pro. Ex. 18 | Pro. Ex. 19 | Pro. Ex. 20 | Pro. Ex. 21 | Pro. Ex. 22 | Pro. Ex. 23 | Pro. Ex. 24 | Pro. Ex. 25 |
|---|---|---|---|---|---|---|---|---|---|---|---|
| Polyol component | Polyol A | 40 | 40 | 40 | 40 | 40 | 40 | 40 | 40 | 40 | 40 |
| | Polyol B | 20 | 20 | 20 | 20 | 20 | 20 | 20 | 20 | 20 | 20 |
| | Polyol C | 35 | 35 | 35 | 35 | 35 | 39 | 37 | 37 | 39 | 39.93 |
| | Polymer-dispersed polyol | F1 5 | F2 5 | F3 1 | F4 1 | F6 5 | F8 1 | F9 3 | F10 3 | F11 1 | F12 0.07 |
| | Average hydroxyl value (mgKOH/g) | 345 | 345 | 343 | 343 | 345 | 359 | 352 | 352 | 359 | 362 |
| Flame retardant | | 10 | 10 | 10 | 10 | 10 | 10 | 10 | 10 | 10 | 10 |
| Blowing agent A | | 6 | 6 | 6 | 6 | 6 | 6 | 6 | 6 | 6 | 6 |
| Surfactant | | 1 | 1 | 1 | 1 | 1 | 1 | 1 | 1 | 1 | 1 |
| Catalyst A | | 0.5 | 0.5 | 0.5 | 0.5 | 0.5 | 0.5 | 0.5 | 0.5 | 0.5 | 0.5 |
| Polyisocyanate | | 191 | 191 | 194 | 194 | 191 | 194 | 192 | 192 | 194 | 195 |
| INDEX | | 110 | 110 | 110 | 110 | 110 | 110 | 110 | 110 | 110 | 110 |
| Gel time (seconds) | | 28 | 26 | 27 | 28 | 27 | 28 | 26 | 26 | 26 | 27 |
| Box free density (Kg/m$^3$) | | 22.6 | 22.4 | 22.6 | 22.7 | 22.1 | 23.0 | 22.0 | 21.9 | 22.5 | 22.9 |
| Compression strength (MPa) | // | 0.15 | 0.15 | 0.14 | 0.16 | 0.14 | 0.158 | 0.154 | 0.148 | 0.117 | 0.145 |
| | ⊥ | 0.06 | 0.06 | 0.07 | 0.07 | 0.07 | 0.066 | 0.065 | 0.062 | 0.073 | 0.075 |
| | // + ⊥ | 0.21 | 0.21 | 0.21 | 0.23 | 0.21 | 0.224 | 0.219 | 0.210 | 0.190 | 0.220 |
| High temperature 70° C. 24 hr | X (150 mm) | −0.24 | 0.60 | 0.57 | 1.17 | 1.00 | 0.01 | 0.58 | 0.84 | −0.02 | 0.19 |
| | Y (75 mm) | 0.44 | −0.11 | −0.18 | 0.00 | 0.00 | −0.04 | −0.19 | 0.21 | −0.07 | 0.07 |
| | Z (100 mm) | −0.04 | 0.08 | 0.23 | 0.72 | 0.80 | −0.04 | 0.40 | 0.37 | −0.11 | 0.29 |
| Wet heat 70° C. 95% 24 hr | X (150 m) | 0.49 | −0.21 | 0.79 | 0.72 | 0.20 | 0.42 | −2.67 | 0.42 | 0.68 | 0.15 |
| | Y (75 mm) | 0.74 | 0.65 | 0.47 | 0.38 | 0.50 | 0.80 | 0.87 | 0.73 | 0.81 | 0.98 |
| | Z (100 mm) | 0.08 | 0.18 | 0.71 | 0.25 | 0.70 | 0.53 | −0.91 | 0.55 | 0.56 | 0.71 |
| Dimensional stability | | ⊚ | ⊚ | ⊚ | ○ | ○ | ⊚ | ○ | ⊚ | ⊚ | ⊚ |
| Thermal conductivity (mW/mK) | | 25.3 | 24.8 | 27.0 | 26.8 | 25.7 | 23.42 | 23.47 | 24.09 | 24.24 | 26.02 |
| Heat-insulating properties | | ○ | ○ | ○ | ○ | ○ | ○ | ○ | ○ | ○ | ○ |
| Storage stability (23° C., one week) | | ○ | ○ | ○ | ○ | ○ | ○ | ○ | ○ | ○ | ○ |
| Storage stability (23° C., one month) | | ○ | ○ | ○ | X | X | X | X | ○ | ○ | X |

TABLE 7

| | | Pro. Ex. 26 | Pro. Ex. 27 | Pro. Ex. 28 | Pro. Ex. 29 | Pro. Ex. 30 | Pro. Ex. 31 | Pro. Ex. 32 | Pro. Ex. 33 |
|---|---|---|---|---|---|---|---|---|---|
| Polyol component | Polyol A | 40 | 40 | 40 | 40 | 30 | 40 | 40 | 40 |
| | Polyol B | 20 | 20 | 20 | 20 | 30 | 20 | 20 | 20 |
| | Polyol C | 37 | 39 | 39 | 39.5 | 38.5 | 35 | 35 | 35 |

TABLE 7-continued

|  |  | Pro. Ex. 26 | Pro. Ex. 27 | Pro. Ex. 28 | Pro. Ex. 29 | Pro. Ex. 30 | Pro. Ex. 31 | Pro. Ex. 32 | Pro. Ex. 33 |
|---|---|---|---|---|---|---|---|---|---|
| Polymer-dispersed polyol | | F13 3.0 | F13 1.0 | F14 1.0 | F14 0.5 | F13 1.5 | F15 5 | | |
| PTFE powder | | | | | | | | 0.1 | |
| Polyol D | | | | | | | | | 5 |
| Average hydroxyl value (mgKOH/g) | | 352 | 359 | 359 | 360 | 357 | 359 | 343 | 345 |
| Flame retardant | | 10 | 10 | 10 | 10 | 10 | 10 | 10 | 10 |
| Blowing agent A | | 6 | 6 | 6 | 6 | 5 | 6 | 6 | 6 |
| Surfactant | | 2 | 2 | 2 | 1 | 1 | 1 | 1 | 1 |
| Catalyst A | | 0.5 | 0.5 | 0.5 | 0.5 | | 0.5 | 0.5 | 0.5 |
| Catalyst B | | | | | | 1 | | | |
| Polyisocyanate | | 192 | 194 | 194 | 195 | 175 | 191 | 195 | 191 |
| INDEX | | 110 | 110 | 110 | 110 | 110 | 110 | 110 | 110 |
| Gel time (seconds) | | 26 | 25 | 26 | 26 | 19 | 28 | 27 | 25 |
| Box free density (Kg/m³) | | 22.9 | 22.9 | 23.2 | 22.6 | 24.5 | 22.3 | 22.4 | 22.4 |
| Compression strength (MPa) | // | 0.160 | 0.162 | 0.156 | 0.169 | 0.15745 | 0.13 | 0.15 | 0.15 |
| | ⊥ | 0.066 | 0.072 | 0.075 | 0.062 | 0.0693 | 0.06 | 0.07 | 0.05 |
| | // + ⊥ | 0.226 | 0.234 | 0.231 | 0.231 | 0.227 | 0.19 | 0.220 | 0.200 |
| High temperature 70° C. 24 hr | X (150 mm) | 0.98 | −1.57 | 0.95 | 0.4 | 0.21 | 0.37 | 1.06 | −33.2 |
| | Y (75 mm) | −0.05 | 0.08 | 0.04 | −0.18 | 0.09 | −0.06 | −0.12 | −6.42 |
| | Z (100 mm) | 0.48 | −0.86 | 0.37 | 0 | 0.23 | 0.23 | 0.55 | −11.6 |
| Wet heat 70° C. 95% 24 hr | X (150 m) | 0.16 | −3.24 | 0.37 | −0.41 | 0.77 | 1.06 | 0.82 | −28.8 |
| | Y (75 mm) | 0.70 | 0.9 | 0.72 | 0.65 | 0.65 | 0.31 | 0.72 | −12.3 |
| | Z (100 mm) | 0.23 | −2.14 | 0.3 | −0.4 | 0.77 | 1.04 | 0.77 | −16.7 |
| Dimensional stability | | ◉ | ○ | ◉ | ◉ | ◉ | ○ | ○ | X |
| Thermal conductivity (mW/mK) | | 24.78 | 23.7 | 25.64 | 23.80 | 22.53 | 28.1 | 26.1 | 23.7 |
| Heat-insulating properties | | ○ | ○ | ○ | ○ | ○ | X | ○ | ○ |
| Storage stability (23° C., one week) | | ○ | ○ | ○ | ○ | ○ | ○ | X | ○ |
| Storage stability (23° C., one month) | | ○ | ○ | X | X | ○ | ○ | X | ○ |

TABLE 8

|  |  | Pro. Ex. 34 | Pro. Ex. 35 | Pro. Ex. 36 | Pro. Ex. 37 |
|---|---|---|---|---|---|
| Polyol H | | 70 | 70 | 70 | 70 |
| Polyol I | | 29.1 | 29.1 | 29.9 | 25 |
| Polymer-dispersed polyol | | F11 0.9 | F13 0.9 | | |
| PTFE powder | | | | 0.1 | |
| Polyol D | | | | | 5 |
| Average hydroxyl value (mgKOH/g) | | 228 | 228 | 230 | 217 |
| Flame retardant | | 20 | 20 | 20 | 20 |
| Blowing agent A | | 5 | 5 | 5 | 5 |
| Surfactant | | 1 | 1 | 1 | 1 |
| Catalyst B | | 1.3 | 1.3 | 1.3 | 1.3 |
| Catalyst C | | 2 | 2 | 2 | 2 |
| Catalyst D | | 2 | 2 | 2 | 2 |
| Polyisocyanate | | 169 | 169 | 170 | 166 |
| INDEX | | 130 | 130 | 130 | 130 |
| Gel time (seconds) | | 11 | 11 | 11 | 12 |
| Box free density (Kg/m³) | | 28.8 | 28.8 | 28.7 | 28.7 |
| Compression strength (MPa) | // | 0.1881 | 0.1887 | 0.192 | 0.1692 |
| | ⊥ | 0.0781 | 0.0783 | 0.081 | 0.0337 |
| | // + ⊥ | 0.2662 | 0.267 | 0.273 | 0.2029 |
| High temperature | X (150 mm) | 0.46 | 0.53 | 0.5 | −31.94 |
| 70° C. 24 hr | Y (75 mm) | 0.32 | 0.32 | 0.2 | −2.79 |
| | Z (100 mm) | 0.58 | 0.59 | 0.4 | −33.95 |
| Wet heat 70° C. 95% 24 hr | X (150 m) | −0.12 | −0.32 | −0.1 | −37.44 |
| | Y (75 mm) | 0.66 | 0.40 | 0.44 | −10.23 |
| | Z (100 mm) | 0.42 | 0.51 | 0.42 | −45.53 |
| Dimensional stability | | ◉ | ◉ | ◉ | X |
| Thermal conductivity (mW/mK) | | 25.5 | 25.4 | 33.09 | 23 |
| Heat-insulating properties | | ○ | ○ | X | ○ |
| Storage stability (23° C., one week) | | ○ | ○ | X | ○ |
| Storage stability (23° C., one month) | | ○ | ○ | X | ○ |

TABLE 9

|  |  | Pro. Ex. 38 | Pro. Ex. 39 | Pro. Ex. 40 | Pro. Ex. 41 |
|---|---|---|---|---|---|
| Polyol J | | 42 | 42 | 44.9 | 40 |
| Polyol K | | 35 | 35 | 35 | 35 |
| Polyol L | | 20 | 20 | 20 | 20 |
| Polymer-dispersed polyol | | F11 0.9 | F13 0.9 | | |
| PTFE powder | | | | 0.1 | |
| Polyol D | | | | | 5 |
| Average hydroxyl value (mgKOH/g) | | 573 | 573 | 588 | 564 |
| Flame retardant | | 10 | 10 | 10 | 10 |
| Blowing agent A | | 2 | 2 | 2 | 2 |
| Blowing agent B | | 19 | 19 | 19 | 19 |
| Surfactant | | 1 | 1 | 1 | 1 |
| Catalyst B | | 0.2 | 0.2 | 0.2 | 0.2 |
| Catalyst C | | 0.2 | 0.2 | 0.2 | 0.2 |
| Catalyst D | | 0.2 | 0.2 | 0.2 | 0.2 |
| Polyisocyanate | | 177 | 177 | 181 | 175 |
| INDEX | | 105 | 105 | 105 | 105 |
| Gel time (seconds) | | 59 | 59 | 60 | 60 |
| Box free density (Kg/m³) | | 26.1 | 26.4 | 27.2 | 27.4 |
| Compression strength (MPa) | // | 0.1353 | 0.1367 | 0.140 | 0.145 |
| | ⊥ | 0.055 | 0.055 | 0.053 | 0.062 |
| | // + ⊥ | 0.190 | 0.192 | 0.193 | 0.207 |
| Low temperature −30° C. 50 hr | X (150 mm) | −3.08 | −2.87 | −3.12 | −24.57 |
| | Y (75 mm) | −0.83 | −0.82 | −0.62 | −1.16 |
| | Z (100 mm) | −1.74 | −1.26 | −1.72 | −13.65 |
| Wet heat 70° C. 95% 50 hr | X (150 m) | 2.19 | 2.00 | 1.98 | 2.72 |
| | Y (75 mm) | 0.16 | 0.17 | 0.15 | 0.18 |
| | Z (100 mm) | 1.60 | 1.47 | 1.59 | 2.53 |
| Dimensional stability | | ○ | ○ | ○ | X |
| Thermal conductivity (mW/mK) | | 21.25 | 21.06 | 23.81 | 20.99 |
| Heat-insulating properties | | ○ | ○ | X | ○ |
| Storage stability (23° C., one week) | | ○ | ○ | X | ○ |
| Storage stability (23° C., one month) | | ○ | ○ | X | ○ |

TABLE 10

|  |  | Pro. Ex. 42 | Pro. Ex. 43 | Pro. Ex. 44 | Pro. Ex. 45 |
|---|---|---|---|---|---|
| Polyol A | | 99.5 | 99.5 | 99.9 | 99.5 |
| Polymer-dispersed polyol | | F13 0.5 | F14 0.5 | | |
| PTFE powder | | | | 0.1 | |
| Polyol D | | | | | 0.5 |
| Average hydroxyl value (mgKOH/g) | | 348 | 348 | 350 | 348 |
| Flame retardant | | 15 | 15 | 15 | 15 |
| Blowing agent A | | 4 | 4 | 4 | 4 |
| Blowing agent C | | 25 | 25 | 25 | 25 |
| Surfactant | | 1 | 1 | 1 | 1 |
| Catalyst F | | 1.5 | 1.5 | 1.5 | 1.5 |
| Polyisocyanate | | 163 | 163 | 164 | 163 |
| INDEX | | 110 | 105 | 105 | 105 |
| Gel time (seconds) | | 59 | 58 | 60 | 60 |
| Box free density (Kg/m³) | | 22.7 | 22.8 | 23.4 | 23.3 |
| Compression strength (MPa) | // | 0.194 | 0.208 | 0.165 | 0.218 |
| | ⊥ | 0.054 | 0.051 | 0.049 | 0.042 |
| | // + ⊥ | 0.248 | 0.259 | 0.214 | 0.260 |
| Low temperature 0° C. 24 hr | X (150 mm) | −0.73 | −0.42 | −0.42 | −0.49 |
| | Y (75 mm) | 0.35 | 0.19 | 0.27 | 0.27 |
| | Z (100 mm) | −0.64 | −0.64 | −0.44 | −0.43 |
| Wet heat −30° C. 24 hr | X (150 m) | −4.89 | −4.31 | −3.95 | −11.53 |
| | Y (75 mm) | −0.07 | −0.28 | 0.05 | −0.66 |
| | Z (100 mm) | −4.02 | −3.92 | −3.23 | −12.18 |
| Dimensional stability | | ○ | ○ | ○ | X |
| Thermal conductivity (mW/mK) | | 20.65 | 20.74 | 23.76 | 21.00 |
| Heat-insulating properties | | ○ | ○ | X | ○ |
| Storage stability (23° C., one week) | | ○ | ○ | X | ○ |
| Storage stability (23° C., one month) | | ○ | X | X | ○ |

As is evident from the results shown in Tables 6 to 10, it was confirmed that the storage stability (one week) was excellent in the case of using polymer-dispersed polyols F1 to F4, F6 and F8 to 14 produced by the method for producing a polymer-dispersed polyol of the present invention.

Further, it was confirmed that the rigid polyurethane foams in Production Examples 16 to 30, 34 to 35, 38 to 39, 42 and 43, produced by using polymer-dispersed polyols F1 to F4, F6 and F8 to F14, were good in both the heat-insulating properties and the dimensional stability.

Further, it was confirmed that in a case where polymer-dispersed polyols F1 to F3, F10, F11 and F13 were employed, the rigid polyurethane foams were excellent also in storage stability (for one month).

It was thereby found that in the method for producing a polymer-dispersed polyol, it is possible to obtain a further remarkable effect for improving the storage stability by adjusting the oxyethylene group content in the polyether polyol (Y) to be at least 60 mass % and containing acrylonitrile or vinyl acetate as the monomer having a polymerizable unsaturated group.

On the other hand, it was confirmed that as shown in Production Examples 32, 36, 40 and 44, the storage stability (one week, one month) was poor when PTFE powder was used.

It was confirmed that the rigid polyurethane foam in Production Example 31 produced by using polymer-dispersed polyol F15 employing no fluorinated monomer (f), was poor in the heat-insulating properties.

It was confirmed that the rigid polyurethane foams in Production Examples 33, 37, 41 and 45 produced by using polyol D containing no polymer particles, were poor in dimensional stability.

INDUSTRIAL APPLICABILITY

A polymer-dispersed polyol obtained by the method of the present invention is useful for the production of a rigid polyurethane foam. Further, the polymer-dispersed polyol is excellent in storage stability even when mixed with a polyol having a small molecular weight for rigid polyurethane foams.

Further, by using such a polymer-dispersed polyol, weight reduction is feasible, and it is possible to obtain a rigid polyurethane foam excellent in both heat-insulating properties and dimensional stability. Further, such a polymer-dispersed polyol is useful for the production of e.g. foams pour-in-place urethane foams, continuously produced board-stock or spray-blown foams.

The entire disclosure of Japanese Patent Application No. 2006-312811 filed on Nov. 20, 2006 including specification, claims and summary is incorporated herein by reference in its entirety.

What is claimed is:

1. A method for producing a polymer-dispersed polyol for rigid polyurethane foams, having polymer particles dispersed in a polyol, which comprises polymerizing a monomer having a polymerizable unsaturated group in a polyol (X), wherein the polyol (X) contains a polyether polyol (Y) having an oxyethylene group content of at least 10 mass %, and the monomer having a polymerizable unsaturated group contains a fluorinated acrylate or a fluorinated methacrylate.

2. The method for producing a polymer-dispersed polyol according to claim 1, wherein the fluorinated acrylate or the fluorinated methacrylate is a monomer represented by the following formula (1):

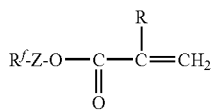

Formula (1)

wherein $R^f$ is a $C_{1-18}$ polyfluoroalkyl group, R is a hydrogen atom or a methyl group, and Z is a bivalent linking group.

3. The method for producing a polymer-dispersed polyol according to claim 1, wherein the monomer having a polymerizable unsaturated group further contains at least one member selected from the group consisting of acrylonitrile, vinyl acetate and styrene.

4. The method for producing a polymer-dispersed polyol according to claim 1, wherein the polyether polyol (Y) has an oxyethylene group content of at least 60 mass %.

5. The method for producing a polymer-dispersed polyol according to claim 1, wherein the polyether polyol (Y) has a hydroxyl value of at most 84 mgKOH/g.

6. The method for producing a polymer-dispersed polyol according to claim 1, wherein the polyether polyol (Y) is a polyoxyalkylene polyol obtained by addition-polymerizing propylene oxide and ethylene oxide to a polyhydric alcohol.

7. The method for producing a polymer-dispersed polyol according to claim 2, wherein the proportion of the monomer represented by the formula (1) in the entire monomer having a polymerizable unsaturated group, is from 30 to 100 mass %.

8. The method for producing a polymer-dispersed polyol according to claim 2, wherein the monomer represented by the formula (1) is one wherein $R^f$ is a $C_{3-8}$ polyfluoroalkyl group, and Z is an alkylene group or an arylene group.

9. The method for producing a polymer-dispersed polyol according to claim 2, wherein the monomer represented by the formula (1) is any one of monomers represented by the following formulae (1-1) to (1-3):

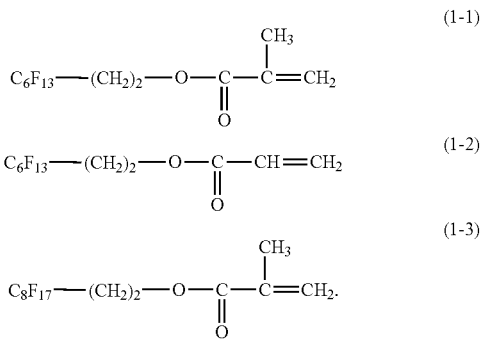

10. The method for producing a polymer-dispersed polyol according to claim 1, wherein the concentration of the polymer particles is from 1 to 50 mass %.

* * * * *